United States Patent
Andrews

[15] 3,678,964
[45] July 25, 1972

[54] ADJUSTABLE GUIDE CONNECTOR FOR BOWDEN CABLE

[72] Inventor: David Andrews, Welling, England
[73] Assignee: Ford Motor Company, Dearborn, Mich.
[22] Filed: Oct. 1, 1970
[21] Appl. No.: 77,154

[30] Foreign Application Priority Data
Feb. 6, 1970  Great Britain..........................5,896/70

[52] U.S. Cl..............................138/103, 74/501 P, 138/147
[51] Int. Cl. ............................................................F16c 1/10
[58] Field of Search .......................74/501, 501 P; 85/32 V; 137/223; 138/103, 109, 147, 177, 178; 285/174

[56] References Cited
UNITED STATES PATENTS
3,443,452  5/1969  Shontz............................74/501 P UX
2,126,770  8/1938  Hammond..........................137/223 X
3,345,899  10/1967  Fiddler....................................85/32 V
3,393,578  7/1968  Tschanz................................74/501 P
3,468,187  9/1969  Payerle.................................74/501 X Primary Examiner—Edward J. Earls
Attorney—John R. Faulkner and Robert W. Brown

[57] ABSTRACT

An adjustable connector for connection to the guide conduit of a Bowden cable is described. The adjustable connector comprises a tube and a liner mounted within the tube. The liner extends beyond one end of the tube to form a thickened portion having an opening into which the cable guide conduit is inserted and bonded to the liner. Means are described for preventing axial and rotational movement of the tube relative to the liner. In use, the core of the Bowden cable passes through the tube and liner assembly.

1 Claim, 2 Drawing Figures

Patented July 25, 1972
3,678,964
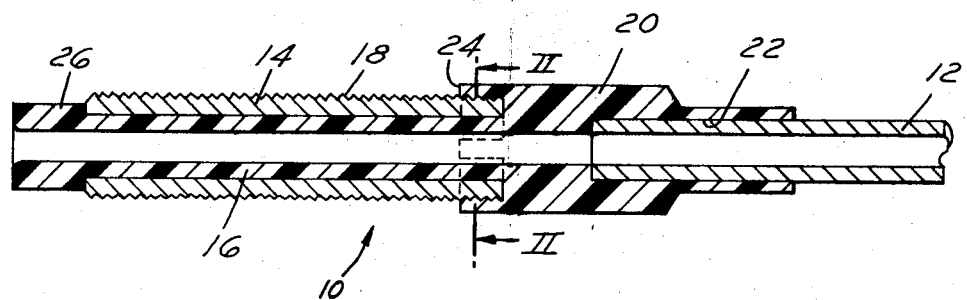
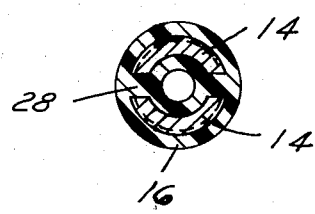
INVENTOR
DAVID ANDREWS
BY
John R. Faulkner
Robert W. Brown
ATTORNEYS

ADJUSTABLE GUIDE CONNECTOR FOR BOWDEN CABLE

BACKGROUND OF THE INVENTION

The present invention relates in general to Bowden cables and, more particularly, to an adjustable guide connector for a Bowden cable.

A Bowden cable is used for transmitting motion occurring at one location to a remote location. These cables include a flexible guide conduit and a flexible core movably mounted within the guide conduit. The guide conduit permits the cable within to withstand both compressive and tensile forces. The cables are made flexible so that motion occurring at one location may be transmitted along a curvilinear path to a remote location. Where motion is to be maintained along such a curvilinear path, it is necessary to fix the location of points on the guide conduit at opposite ends of the curvilinear path to substantially maintain constant the length of the curvilinear path. Usually, the fixed points on the guide conduit are the opposite ends thereof. With the length of the guide conduit path thus maintained, motion at one end of the movable core located within the guide conduit produces a substantially identical motion at the opposite end of the movable core.

In the use of Bowden cables, it occasionally becomes necessary to adjust the length of the curvilinear path of the guide conduit. The present invention concerns an adjustable connector for attachment to the end of the guide conduit of a Bowden cable to fix the location thereof when the cable is in use and which may be readily adjusted to change the effective length of the guide conduit between the fixed points at opposite ends of the guide conduit curvilinear path.

SUMMARY OF THE INVENTION

In accordance with the present invention, an adjustable guide connector for a Bowden cable comprises a tube having an internal diameter greater than the internal diameter of the cable guide conduit and a linear mounted within the tube. The tube preferably is made from metal and the liner from a resinous material. The liner extends beyond one end of the tube to form a thickened portion which has an opening therein adapted to receive the end of the cable guide conduit. The cable guide conduit, when located within this opening in the thickened portion of the liner, is bonded thereto. Preferably, this is accomplished by molding the liner around the end of the cable guide conduit, thereby, simultaneously to form the opening in the liner and to bond it to the guide conduit. This bond may be mechanical or chemical in nature. The tube and liner may be provided with means to prevent relative rotational and axial movement between the tube and the liner.

The invention may be better understood by reference to the description of the preferred embodiment which follows and to the drawings.

BRIEF DESCRIPTION OF THE DRAWINGS

FIG. 1 is a cross-sectional view of an adjustable guide connector constructed in accordance with the invention and bonded to a Bowden-cable guide conduit; and FIG. 2 is a cross-sectional view taken along the line II—II of FIG. 1.

DESCRIPTION OF THE PREFERRED EMBODIMENT

With reference to the drawings, the preferred embodiment of the adjustable guide connector is shown generally at 10. The adjustable guide connector is shown attached to the guide conduit 12 of a Bowden cable, which, in use, would contain an inner flexible core (not shown).

The adjustable guide connector comprises a tube 14 and a liner 16. Preferably, the tube 14 is made of metal and is externally threaded at 18 to provide means for adjusting the axial position of the adjustable guide connector 10, and guide conduit 12 attached thereto, relative to a fixed mounting location. As is most clearly shown in FIG. 1, tube 14 has an internal diameter which is greater than the internal diameter of the guide conduit 12 used in conjunction with the connector.

Liner 16 is mounted within tube 14. Preferably, liner 16 is made from a moldable plastic material, such as polyacetal resin. It has an internal diameter substantially corresponding to the internal diameter of the guide conduit 12 of the Bowden cable. Thus, the cable core may be movably positioned within the liner 16, which provides a low friction surface against which the core of the Bowden cable can slide.

The liner 16 extends beyond one end of the tube 14 to form a thickened portion 20 having an opening 22 therein adapted to receive the guide conduit 12 of the Bowden cable.

When located within the opening 22 in the thickened portion 20 of the liner 16, the guide conduit 12 is bonded thereto by any suitable means. Preferably, this bonding is accomplished by molding liner 16 around the guide conduit 12 and, at the same time, within tube 14. The bond may be mechanical, chemical, or both, depending upon the materials and processes used in forming the assembly of the adjustable guide connector with the guide conduit 12. Also, the thickened portion 20 of liner 16 may cover a portion of the exterior of tube 14, as is shown at 24.

Liner 16 extends beyond the other end of tube 14 to form another thickened portion 26. This thickened portion 26 abuts this end of tube 14, as does the thickened portion 20 at the opposite end of tube 14. The abutting relationship of these thickened portions limits the axial movement of tube 14 relative to liner 16. Rotational movement of tube 14 relative to liner 16 is prevented by means of a slot 28 in tube 14, which may be filled with the material of liner 16, as is most clearly shown in FIG. 2.

Based upon the foregoing description of the invention, what is claimed and desired to be protected by Letters Patent is:

1. An adjustable guide connector for a flexible cable for transmitting motion occurring at one location to a remote location, the cable including a flexible guide conduit adapted to receive within it a flexible and movable core, said adjustable guide connector comprising:

a tube having an internal diameter greater than the internal diameter of the cable guide conduit to be used in conjunction with said connector, said tube being externally threaded and having at least one slot located at one of its ends; and a liner mounted within said tube, said liner having an internal diameter corresponding to the internal diameter of the flexible guide conduit whereby the core may be movably positioned within said liner, said liner extending beyond said one end of said tube to form a first thickened portion abutting said one end of said tube and covering a portion of the exterior of said tube, said first thickened portion having an opening therein adapted to receive the cable guide conduit, said slot at said one end of said tube being filled with the material of said liner thereby to prevent rotational movement of said tube with respect to said liner, and said liner having a second thickened portion extending beyond the other end of said tube and in abutting relationship with said other end of said tube thereby to prevent axial movement of said tube with respect to said liner;

such guide connector in use permitting the effective length of the cable guide conduit to be adjusted through the axial movement of said tube with respect to a fixed mounting location.

* * * * *